(No Model.) 2 Sheets—Sheet 1.
L. B. CURTIS.
PIPE THREADING ATTACHMENT FOR LATHES.
No. 465,838. Patented Dec. 29, 1891.
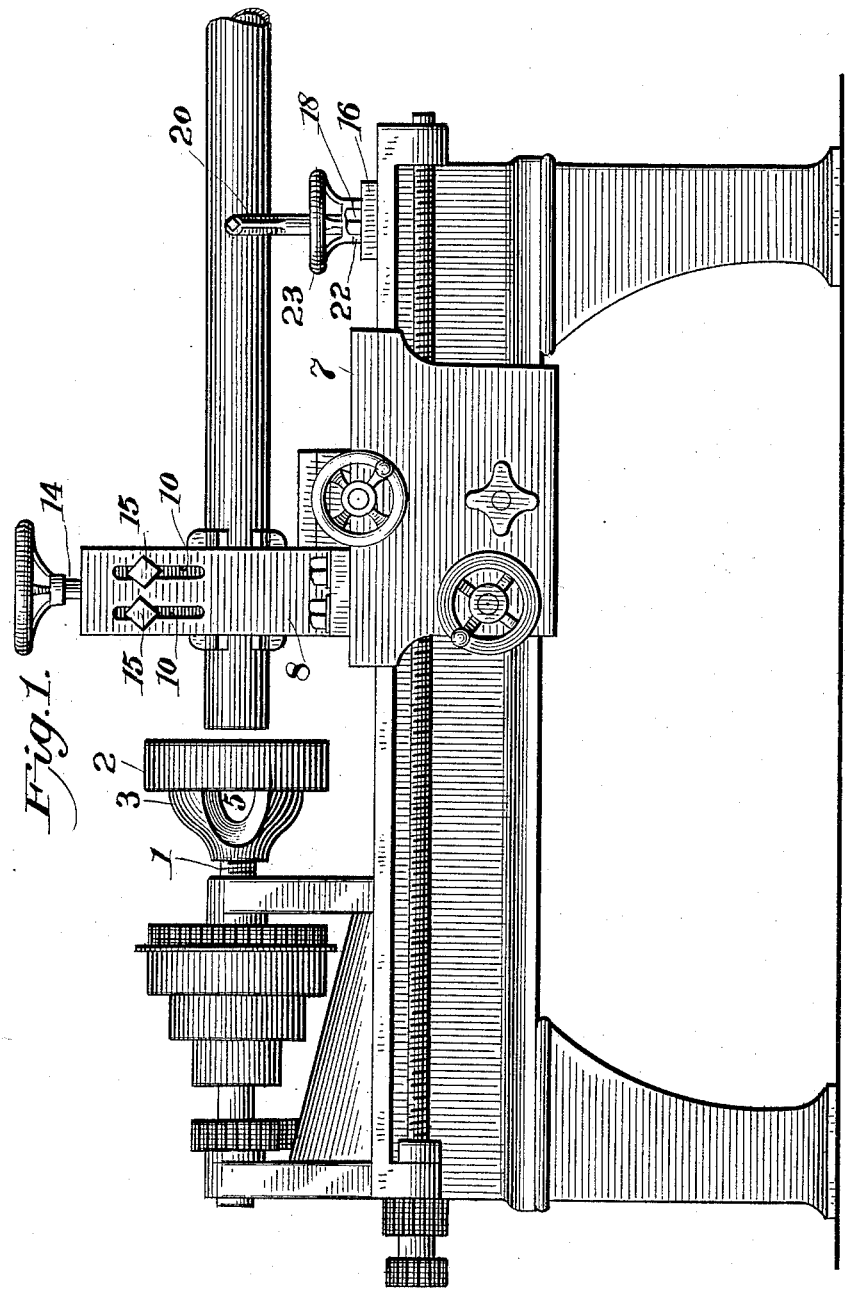
WITNESSES:
J. F. Finch
S. F. Williamson.
INVENTOR
L. B. Curtis
BY
ATTORNEY (No Model.) 2 Sheets—Sheet 2.
L. B. CURTIS.
PIPE THREADING ATTACHMENT FOR LATHES.
No. 465,838. Patented Dec. 29, 1891.
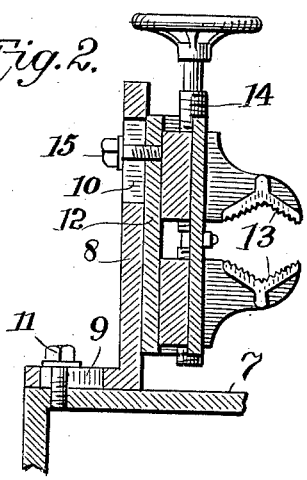
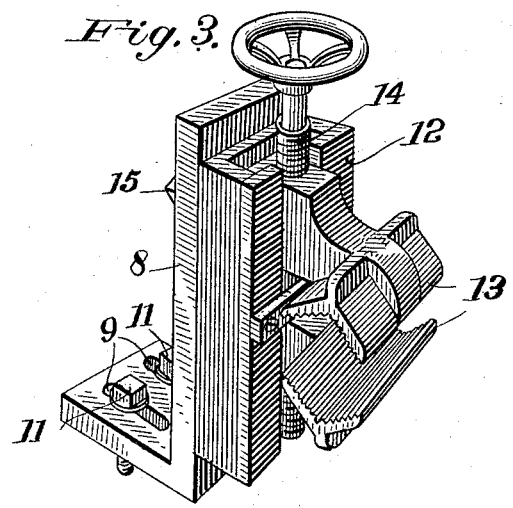
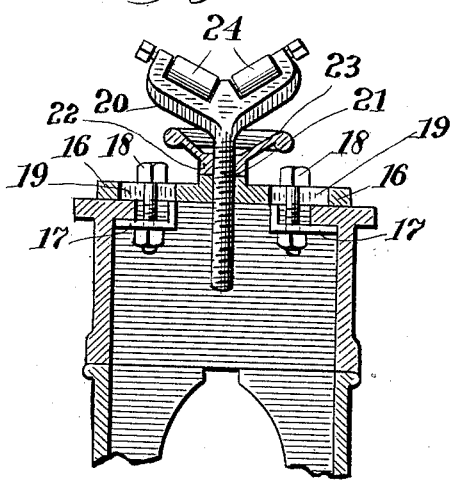
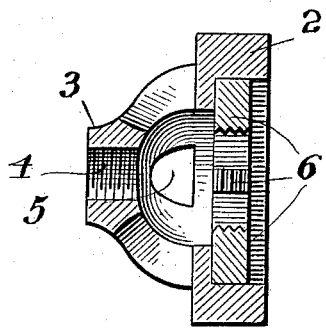
WITNESSES:
J. F. Finch,
S. S. Williamson.
INVENTOR
L. B. Curtis
BY
F. W. Smith Jr.
ATTORNEY

UNITED STATES PATENT OFFICE.

LEWIS B. CURTIS, OF SOUTHPORT, ASSIGNOR TO CURTIS & CURTIS, OF BRIDGEPORT, CONNECTICUT.

PIPE-THREADING ATTACHMENT FOR LATHES.

SPECIFICATION forming part of Letters Patent No. 465,838, dated December 29, 1891.

Application filed February 19, 1891. Serial No. 382,079. (No model.)

*To all whom it may concern:*

Be it known that I, LEWIS B. CURTIS, a citizen of the United States, residing at Southport, in the county of Fairfield and State of Connecticut, have invented certain new and useful Improvements in Pipe-Threading Attachments for Lathes; and I do hereby declare the following to be a full, clear, and exact description of the invention, such as will enable others skilled in the art to which it appertains to make and use the same.

My invention relates to certain new and useful improvements in pipe-threading attachments for lathes, and has for its object, first, to provide such a device wherein the die-carrying ring shall be so constructed that the chips cut by the threading-dies will be readily discharged, so as not to clog the dies, and, second, to so construct the pipe-vise that it shall be capable of a vertical and lateral adjustment, whereby the pipe may be accurately centered with respect to the threading-dies.

In the accompanying drawings, Figure 1 is a side elevation of a lathe equipped with my improvement; Fig. 2, a detail vertical cross-section of the vise and carriage, the latter being broken away; Fig. 3, a detail perspective of the vise; Fig. 4, a detail cross-section through the pipe support and carriage, and Fig. 5 a detail sectional elevation of the die-carrying ring.

Similar numbers denote like parts in the several figures.

1 is the threaded lathe-spindle, and 2 the die-carrying ring having extending rearwardly therefrom the hollow hub 3, whose outer end is threaded interiorly, as seen at 4. 5 are openings in said hub through which the chips cut by the dies may drop out. 6 are the threading-dies, secured within said ring in any ordinary manner.

7 is the lathe-carriage.

8 is an angle-plate having elongated slots 9 10 in its foot and head, respectively. 11 are bolts extending through the slots 9 into the carriage, whereby said plate 8 is secured on the latter.

12 is the vise-casing, within which the jaws 13 and their operating-screw 14 are arranged in any ordinary manner. 15 are bolts extending through the slots 10 into said casing, whereby the latter is secured to the head of the plate 8. It will thus be seen that the plate 8 has a lateral adjustment on the carriage through the slots 9, and that the bolts 11 secure said plate in any adjustment. Also, it will be seen that the vise-casing 12 has a vertical adjustment through the slots 10, and that the bolts 15 secure said casing in any adjustment. These adjustments of the plate 8 and casing 12 serve to accurately center the jaws 13 of the vise in a plane formed by the intersection of two planes, both of which are passed at right angles to each other through the axis of the lathe-spindle.

16 is a base-plate secured on the bed of the lathe by angle-irons 17 and bolts 18 passed through slots 19 in said plate into said irons, said slots extending crosswise of said plate and elongated to permit of the lateral adjustment of said plate.

20 is an auxiliary support for the pipe having a threaded spindle 21 depending therefrom, which latter is driven within the plate 16, and 22 is a nut on said spindle and having a bearing against the plate. 23 is a hand-wheel rigid with said nut and by means of which the latter may be manipulated to raise and lower the support 20, in order to hold up the pipe to the proper elevation. 24 are friction-rolls journaled in said support, in order that the pipe may drag easily during the operation of threading.

I claim—

1. In a pipe-threading attachment for lathes, a die-carrying ring having a hollow hub provided with lateral openings through which the chips cut by the dies may be discharged, the rear end of said hub being threaded for attachment to the lathe-spindle, substantially as set forth.

2. The combination of the die-carrying ring secured on the lathe-spindle, the vise mounted on the lathe-carriage and capable of a vertical and lateral adjustment, and the auxiliary support for the pipe supported by the lathe-bed and having vertical and lateral adjustments whereby the pipe may be held by the vise without any strain, substantially as set forth.

3. The combination, with the die-carrying ring secured on the lathe-spindle, with the vise mounted on the lathe-carriage and capable of a vertical and lateral adjustment, substantially as set forth.

4. The combination of the angle-plate having elongated slots in its head and foot, the vise-casing secured to said head through said slots, and the lathe-carriage secured to said foot through the slots therein, substantially as set forth.

5. The combination of the angle-plate having slots in its foot and head, respectively, the lathe-carriage, the bolts extending through the slots in said foot into said carriage, the vise-casing, and the bolts extending through the slots in said head into said casing, substantially as set forth.

In testimony whereof I affix my signature in presence of two witnesses.

LEWIS B. CURTIS.

Witnesses:
J. S. HINCH,
F. W. SMITH, Jr.